Feb. 1, 1966      P. W. GURKA      3,231,999
WEED GUARD FOR FISH HOOK OR THE LIKE
Filed Sept. 24, 1963
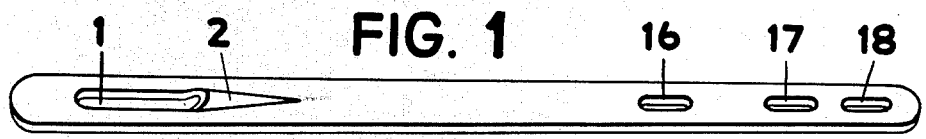
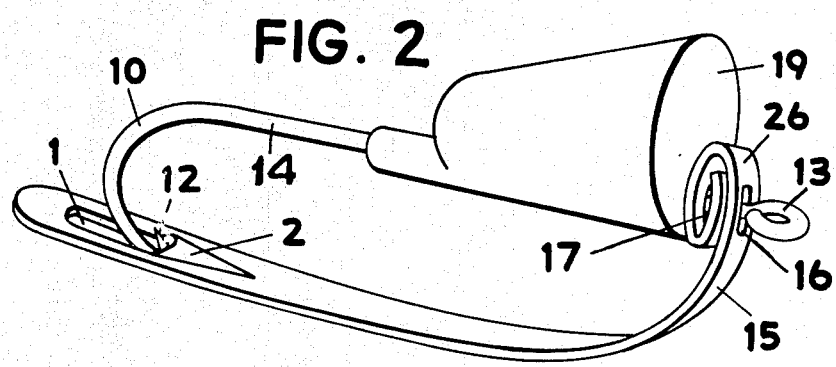
INVENTOR
Philip W. Gurka

United States Patent Office 3,231,999
Patented Feb. 1, 1966

3,231,999
WEED GUARD FOR FISH HOOK OR THE LIKE
Philip W. Gurka, 180 Bellevue Ave.,
Upper Montclair, N.J.
Filed Sept. 24, 1963, Ser. No. 311,155
3 Claims. (Cl. 43—42.09)

The invention relates to the improvement of weed guards that are attached to hooks or lures in a more or less permanent fashion. This type of weed guard necessitates additional operations on the part of the manufacturer to attach said weed guard to hooks or lures. Also, they are not easily replaceable or detachable, requiring tools, implements or devices to execute such an operation. Usually they are too stiff, too light in weight or negate additional luring devices. Also, they usually require too much room in the tackle box.

It is an object of the improvement to provide a weed guard which is attachable to or detachable from a fish hook or lure, without the need of additional tools, implements or devices, with the exception of the snap portion of the fishing line.

Another object is to provide a guard which has the appearance of a lure.

A further object is to provide a guard which allows additional luring devices to be attached to the fish hook or lure.

A still further object is to provide a guard which applies a critical pressure to the hook adjacent the point and barb.

Another further object is to provide a guard which allows for better storage capabilities.

A further object of the present invention is to provide a weed guard of the character described which is inherently attractive and ornamental in appearance and, being in one piece, which is relatively simple, easy and economical to produce.

The foregoing and other advantages and superiorities of the weed guard of the present invention will become more readily comprehensible by the accompanying drawing and description following. It is understood, however, that the embodiment is shown by way of illustration only to make the principles and practice of the invention more readily comprehensible, and without any intent of limiting the invention to the specific details shown.

FIGURE 1 is a perspective view of a form of weed guard as it appears before being attached to a popper type lure.

FIGURE 2 is a perspective view of the weed guard of FIGURE 1 as it appears after being assembled with a popper type lure and ready to assume the desired functions.

Referring to FIG. 1, it will readily be seen that the weed guard is a blank upon which protrusions, recesses, apertures and impressions have been applied. The weed guard is formed from thin, flexible material stiff enough to tend to return to its normal shape after bending and is of such length as to form a weed guard bend 15, said bend provides the spring action necessary to hold and regain the position of seating the hook point and the hook barb 12 in the recessed seat 2, and also provides a crucial tension at the hook point and hook barb.

Essentially, my invention involves a removable weed guard combined with a fish hook having a relatively straight shank or shaft such as indicated at 14 in FIGURE 2, provided at one end with an eye 13 and at its other end with a reverse bend 10 which terminates in a barbed pointed end. This barb is designated 12 and the point is hidden by the guard, the pointed end extending in the same general direction from the reverse bend as the shank.

The guard comprises a one-piece elongated flexible, normally flat strip with a slot 1 near one end for receiving the pointed portion of the adjacent portion of the bend of the hook as it curves toward said strip. Said strip is bent over on itself, as indicated at 15, to exert a shielding force on the barbed point from the shank, whereby one end portion of the said strip shields said pointed end portion, while it is lying on the side of said strip opposite the shank and said strip is resiliently held thereagainst.

The strip is also preferably provided with a recessed seat 2, at the end of the slot 1, for receiving the point portion and barb of the hook as they curve toward said strip. Said seat portion is outwardly embossed so as to protrude toward the shank of the hook, as shown most clearly at 2 in FIGURE 1. At the other end portion of the strip there is a plurality of apertures, in this instance three apertures 16, 17 and 18, through which the hook shank enters and leaves.

FIG. 2 shows the proper installation of an embodiment of my invention on a popper type lure. This installation applies equally to hair bug type lures. The application to one of said lures is as follows:

The hook eye 13 is inserted through the hook eye oblong aperture 17 in the guard of FIGURE 1. The hook eye oblong aperture 18 is then folded toward the hook eye 13 and pushed on. The hook eye oblong aperture 16 is then folded toward the hood eye 13 and pushed on. Said applications should now form a coil 26. This coil 26 should now be given a quarter turn with the opposite end of the weed guard facing the hook point 11, thus locking the coil 26 to the hook eye 13 and the popper face 19, that is, between said eye and face acting as stop means for holding the coil compressed therebetween. The opposite end of the weed guard is now applied to the hook point 11 by bending the free end of the guard toward the hook point, whereby the hook point is inserted through the hook bend aperture 1 allowing the hook point to rest in the recessed seat 2 with the inner side of the pointed end portion shieldingly engaged by the guard along the full length of said end portion from the point to at least where the barb projects from the hook, with the point of the barb overhanging the hook bend aperture 1. The snap portion of the fishing line is then attached through the hook eye 13. To remove the weed guard, just reverse the above process.

The spring or tension of the weed guard can then be adjusted by placing the thumb on top of the weed guard bend 15 and the forefinger on the bottom of the hook eye 13, then depressing gently between thumb and forefinger. The spring can be tested by depressing the end where the hook bend aperture 1 rides up and down the hook bend 10, to see that the action is free and smooth.

This completes the description of the weed guard of the present invention. It will be apparent that the weed guard of the present invention is of inherently attractive and decorative appearance.

It will be further apparent that numerous modifications and variations in the weed guard of the present invention may be made by anyone skilled in the art, in accordance with the principles of the invention hereinabove set forth, and without the use of any inventive ingenuity. I desire, therefore, to be protected for any and all such modifications and variations that may be made within the spirit of the invention and the scope of the claims hereto appended.

What I claim is:
1. In combination with a fish hook having a relatively straight shank provided at one end with a reverse bend which terminates in a barbed pointed end portion extending in the same general direction from said reverse bend as said shank, a lure associated with said hook, an eye carried by one of said associated members, and a remov- able weed guard comprising a one-piece elongated flexible normally flat strip attached to the shank and with a slot near one end for receiving said pointed end portion and the adjacent portion of the bend of the hook as they curve toward said strip, said strip being bent over on itself, with the bend of said hook adjacent said pointed end portion passing through said slot, the strip normally engaging and exerting shielding force on the inner side of the barbed point from the shank, said strip being stabilized with respect to the hook by having a series of elongated apertures to receive the eye while folded to aperture registry and pushed on, the apertured portion forming a coil which is then given a quarter turn to resiliently lock between the eye and the adjacent surface of the lure.

2. In combination with a fish hook having a relatively straight shank provided at one end with an eye and at its other end with a reverse bend which terminates in a barbed pointed end portion extending in the same general direction from said reverse bend as said shank, stop means carried by said shank and spaced from the eye, a removable weed guard comprising a one-piece elongated flexible normally flat strip attached to the shank and with a slot near one end for receiving the pointed end portion and the adjacent portion of the bend of the hook as they curve toward said strip, said strip being bent over on itself with the bend of said hook adjacent said pointed end portion passing through said slot, the strip normally engaging and exerting shielding force on the inner side of the barbed point from the shank and stabilized with respect to the hook by having a series of elongated apertures to receive the eye while folded to aperture registry and pushed on, the apertured portion forming a coil which is then given a quarter turn to resiliently lock between the eye and the adjacent surface of the stop means.

3. In a combination as recited in claim 2, wherein said stop means is a lure of the popper type.

References Cited by the Examiner

UNITED STATES PATENTS

| | | | |
|---|---|---|---|
| 378,678 | 2/1888 | Harlow | 43—42.41 |
| 2,185,507 | 1/1940 | Knapp. | |
| 2,319,686 | 5/1943 | Janisch | 43—42.43 |
| 2,567,813 | 9/1951 | Hyland | 43—42.41 |
| 3,040,466 | 6/1962 | Jablonski | 43—42.43 X |

SAMUEL KOREN, *Primary Examiner.*

ABRAHAM G. STONE, *Examiner.*